United States Patent [19]
Martin

[11] Patent Number: 5,269,539
[45] Date of Patent: Dec. 14, 1993

[54] HYDRAULIC SHAFT SEAL

[75] Inventor: John W. Martin, Los Alamitos, Calif.

[73] Assignee: TRW Inc., Lyndhurst, Ohio

[21] Appl. No.: 867,877

[22] Filed: Apr. 13, 1992

[51] Int. Cl.$^5$ ................................................ F16J 15/32
[52] U.S. Cl. .................... 277/228; 277/152; 277/227; 277/DIG. 6
[58] Field of Search .............. 277/227, 228, 152, 233, 277/DIG. 6

[56] References Cited

U.S. PATENT DOCUMENTS

| | | |
|---|---|---|
| 2,249,141 | 7/1941 | Johnson . |
| 2,329,028 | 9/1943 | Austin . |
| 3,443,845 | 1/1969 | Walchle et al. ............ 277/227 |
| 3,469,854 | 9/1969 | Linwood . |
| 3,493,645 | 2/1970 | Sanderson et al. ......... 277/DIG. 6 |
| 3,837,660 | 9/1974 | Poggio ...................... 277/227 |
| 3,970,321 | 7/1976 | Dechavanne ............... 277/227 |
| 4,066,269 | 1/1978 | Linne ........................ 277/DIG. 6 |
| 4,125,266 | 11/1978 | Schonherr et al. ........ 277/DIG. 6 |
| 4,132,421 | 1/1979 | Corsi et al. ................ 277/227 |
| 4,239,243 | 12/1980 | Bainard et al. ............ 277/DIG. 6 |
| 4,251,399 | 2/1981 | Tomoda et al. ............ 525/102 X |
| 4,650,196 | 3/1987 | Bucher et al. .............. 277/152 |
| 4,711,474 | 12/1987 | Patrick ....................... 277/227 X |
| 4,890,849 | 1/1990 | Eason ......................... 277/227 |
| 4,911,454 | 3/1990 | Rapp et al. ................ 277/227 |
| 4,969,653 | 11/1990 | Breen ......................... 277/227 |
| 5,013,052 | 5/1991 | Butler et al. ............... 277/227 |
| 5,018,753 | 5/1991 | Porel ......................... 277/227 |
| 5,078,410 | 1/1992 | Warman et al. ............ 277/152 |

FOREIGN PATENT DOCUMENTS 9007664  7/1990  PCT Int'l Appl. ............ 277/227
962097   6/1963  United Kingdom .

OTHER PUBLICATIONS

*Rubber Technology*, Maurice Morton, Van Nostrand Reinhold, N.Y., 1987, pp. 326, 412, 500, 502, 503.
Product listing, "EYPEL-F" elastomers, pp. 55 and 56.
"AFLAS" Newly Developed Fluororubber, K. Uchijima, Asahi Glass Co., Ltd., Japan, 3 pages.

Primary Examiner—William A. Cuchlinski, Jr.
Assistant Examiner—James K. Folker
Attorney, Agent, or Firm—Tarolli, Sundheim & Covell

[57] ABSTRACT

A hydraulic shaft seal (10) has a first elastomeric part (40) and a second elastomeric part (42). The first elastomeric part (40) has a surface (54) for sealingly engaging the peripheral surface (56) of a shaft (14), and is formed of a vulcanizable elastomeric composition which includes a first fluorinated rubber. The second elastomeric part (42) supports the first elastomeric part (40) in a sealing position, and is formed of a vulcanizable elastomeric composition which includes a second fluorinated rubber but is essentially free of the first fluorinated rubber. The first elastomeric part (40) is co-vulcanized with the second elastomeric part (42) and is bonded to the second elastomeric part (42) by crosslinking between the two elastomeric parts as a result of the co-vulcanization thereof.

13 Claims, 2 Drawing Sheets

HYDRAULIC SHAFT SEAL

FIELD OF THE INVENTION

The present invention relates to a hydraulic shaft seal, and particularly relates to a hydraulic shaft seal in a hydraulic power steering assembly.

BACKGROUND OF THE INVENTION

U.S. Pat. No. 4,911,454 discloses a hydraulic sealing ring which fits between a shaft and a surrounding bore in which the shaft extends. The sealing ring comprises an annular seal formed of an elastic rubber material and a stiffening ring formed of a hard plastic material. The annular seal has a radially inner lip which sealingly engages the shaft, and has a radially outer surface which sealingly engages the bore in which the shaft extends. The stiffening ring supports the annular seal when the annular seal is pressed against the stiffening ring between the shaft and the bore. The annular seal and the stiffening ring are not bonded to each other, but are instead held together by a mechanical interlock.

SUMMARY OF THE INVENTION

In accordance with the present invention, a hydraulic shaft seal comprises a first elastomeric part having a surface means for sealingly engaging the peripheral surface of a shaft, and a supporting means for supporting the first elastomeric part in sealing engagement with the peripheral surface of the shaft. The supporting means comprises a second elastomeric part. The first elastomeric part is formed of a first vulcanizable elastomeric composition which includes a first fluorinated rubber. The second elastomeric part is formed of a second vulcanizable elastomeric composition which includes a second fluorinated rubber. The second elastomeric part is essentially free of the first fluorinated rubber. The first and second elastomeric parts are co-vulcanized and bonded to each other by cross-linking of the first elastomeric composition with the second elastomeric composition as a result of the co-vulcanization.

In a preferred embodiment of the invention, the first fluorinated rubber in the first elastomeric composition remains flexible throughout a wide range of temperatures and chemical conditions. Preferably, the first fluorinated rubber remains flexible at a temperature of approximately −45° and is serviceable up to a temperature of about 350° F. The first elastomeric part of the seal is thus constructed to remain in hydraulic sealing contact with the shaft throughout a wide range of temperatures and chemical conditions. The second fluorinated rubber in the second elastomeric composition remains flexible throughout a narrower range of temperatures and chemical conditions, but is less costly than the first fluorinated rubber. The second elastomeric part of the seal is larger than the first elastomeric part and supports the first elastomeric part in hydraulic sealing engagement with the shaft. The seal is thus constructed efficiently, with the more flexible but more costly first elastomeric part being smaller and being supported in a sealing position by the less flexible but less costly second elastomeric part. Additionally, the cross-linking between the two elastomeric parts of the seal establishes a bond which is stronger than a bond formed by an adhesive, and which is therefore less likely to leak.

In another preferred embodiment of the present invention, the first elastomeric composition further includes an amount of the second fluorinated rubber. That amount of the second fluorinated rubber is blended into the first elastomeric composition to reduce its cost. The first elastomeric part of the seal thus includes both the first and second fluorinated rubbers. Therefore, the first and second elastomeric parts of the seal are readily bonded to each other by cross-linking upon co-vulcanization because the second fluorinated rubber in the second elastomeric part is readily cross-linked with the second fluorinated rubber which is also included in the first elastomeric part. Preferably, the first and second fluorinated rubbers have the same curing system.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF THE PREFERRED EMBODIMENTS

Figure 1:
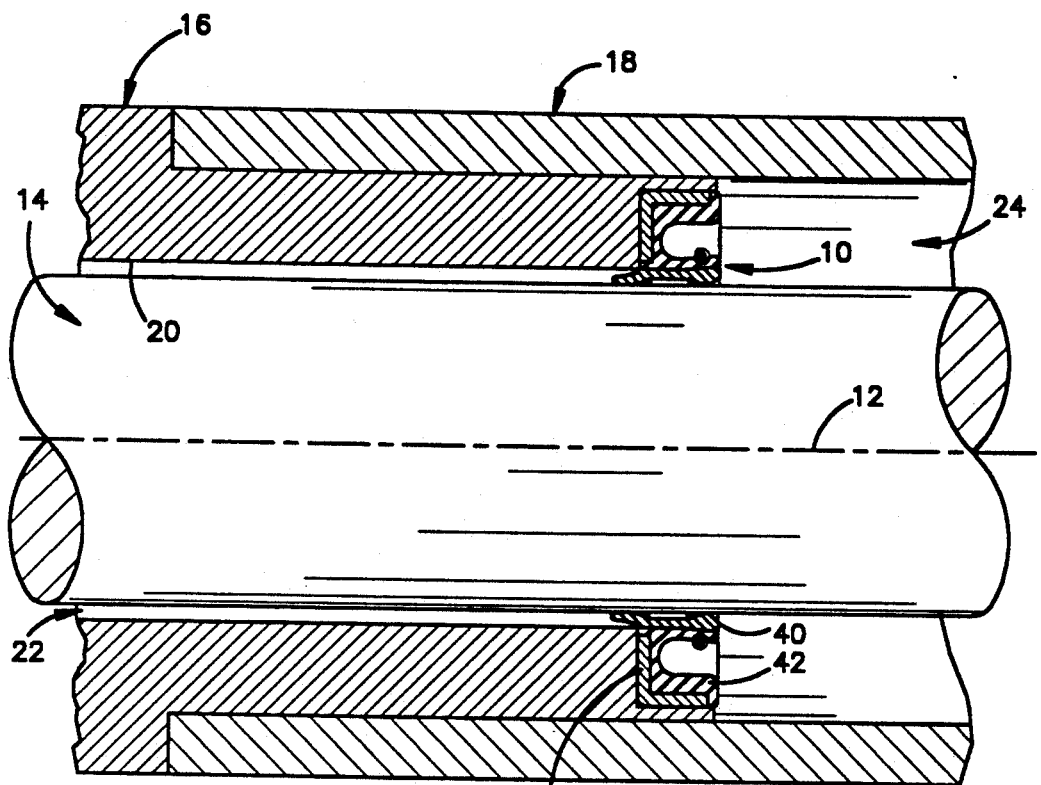
FIG. 1 is a sectional view of a first embodiment of the present invention.
Figure 2:
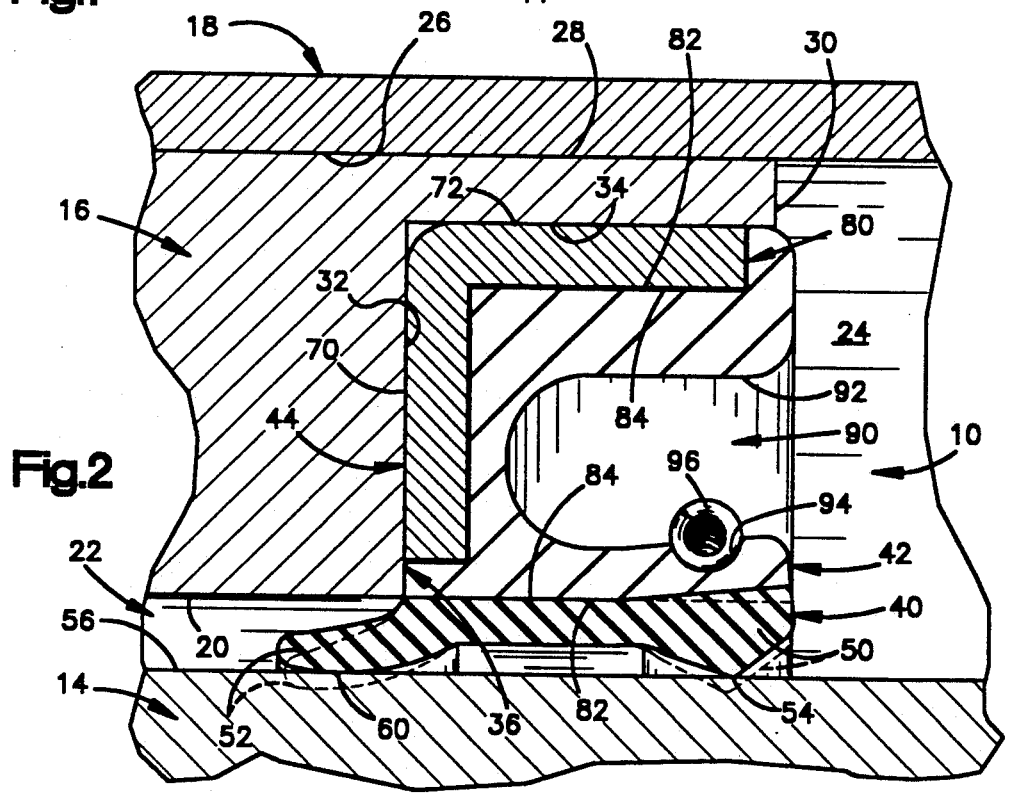
FIG. 2 is an enlarged partial view of the apparatus of FIG. 1.

As shown in FIGS. 1 and 2, a hydraulic shaft seal 10 constructed in accordance with the present invention is a ring-shaped member having a central axis 12. A seal constructed like the seal 10 can be installed in a hydraulic power steering assembly either as a top or bottom seal for an input shaft, or as a rack seal. In the preferred embodiment of the invention shown in FIGS. 1 and 2, the seal 10 is installed in a hydraulic power steering assembly as a rack seal. The hydraulic power steering assembly includes an elongate steering rack 14, a housing 16, and a tubular hydraulic motor wall 18. The rack 14 is connected with steerable vehicle wheels (not shown) in a known manner to effect steering movement of the steerable vehicle wheels upon axial movement of the rack 14. The housing 16 has a cylindrical inner surface 20 defining a passage 22 in which the rack 14 is movable axially, and houses a hydraulic power steering control valve assembly (not shown) which operates in a known manner to control axial movement of the rack 14. The motor wall 18 extends axially from the housing 16 and contains variable volume hydraulic fluid chambers, including a chamber 24 adjacent to the seal 10. Hydraulic power steering fluid flows in the hydraulic fluid chambers to cause axial movement of the rack 14 in response to operation of the valve assembly in the housing 16. The seal 10 is received coaxially over a cylindrical shaft portion of the rack 14 as shown in FIGS. 1 and 2, and blocks leakage of the hydraulic power steering fluid from the adjacent hydraulic fluid chamber 24 to the passage 22 in the housing 16.

As shown in FIG. 2, the motor wall 18 has a cylindrical inner surface 26 which is closely received over a cylindrical outer surface 28 of the housing 16. The housing 16 has a first circular end surface 30, a second circular end surface 32, and a cylindrical end surface 34. The second circular end surface 32 and the cylindrical end surface 34 together define a notch 36 extending circumferentially around the end of the housing 16 between the first circular end surface 30 and the cylindrical inner surface 20. The housing 16 is preferably formed of aluminum and the motor wall 18 is preferably formed of steel, as is known in the art.

The seal 10 fits closely within the notch 36 in the housing 16. The seal 10 has a first elastomeric part 40, a second elastomeric part 42 and a reinforcing part 44. The first elastomeric part 40 is a ring-shaped member having a hydraulic sealing lip 50 and a dust lip 52. The hydraulic sealing lip 50 has an inner surface portion 54 which is pressed firmly in hydraulic sealing contact with the cylindrical outer surface 56 of the rack 14. The hydraulic sealing lip 50 thus blocks the flow of hydraulic power steering fluid past the seal 10 from the adjacent hydraulic fluid chamber 24 to the passage 22 in the housing 16.

As shown in broken lines in FIG. 2, the hydraulic sealing lip 50 has an original inside diameter which is slightly less than the diameter of the outer surface 56 of the rack 14. The hydraulic sealing lip 50 therefore becomes elastically deformed, as shown in solid lines in FIG. 2, when the seal 10 is placed over the rack 14. The width of the surface portion 50, and the force with which it is pressed in hydraulic sealing contact with the outer surface 56 of the rack 14, are thus determined in part by the original inside diameter of the hydraulic sealing lip 50.

The dust lip 52 on the first elastomeric part 40 similarly has a radially inner surface portion 60 which is pressed against the cylindrical outer surface 56 of the rack 14. The dust lip 52 thus blocks the passage of dirt or other contaminants past the seal 10 from the passage 22 in housing 16 to the adjacent hydraulic fluid chamber 24. As with the hydraulic sealing lip 50, the original inside diameter of the dust lip 52, as shown in broken lines, determines the degree to which the surface portion 60 on the dust lip 52 is pressed against the rack 14. Either or both of the surface portions 54 and 60 can be narrower or wider than shown in the drawings.

The reinforcing part 44 of the seal 10 has a circular end surface 70 and a cylindrical outer surface 72. The circular end surface 70 abuts the second circular end surface 32 of the housing 16 in the notch 36. The cylindrical outer surface 72 abuts the cylindrical end surface 34 of the housing 16 in the notch 36, and has a diameter such that the reinforcing part 44 is pressed firmly against the cylindrical end surface 34 of the housing 16 in the notch 36 The reinforcing part 44 thus supports the seal 10 in its installed position in the notch 36. The reinforcing part 44 is preferably formed of aluminum or drawn sheet steel, but can be formed by any metallic or other composition which will impart sufficient strength to the seal 10.

The second elastomeric part 42 is bonded to the reinforcing part 44 by a bond 80. The bond 80 is formed by an adhesive applied between the adjoining surfaces 82 and 84 of the second elastomeric part 42 and the reinforcing part 44. The second elastomeric part 42 is also bonded to the first elastomeric part 40. The first and second elastomeric parts 40 and 42 are bonded to each other by cross-linking between the first and second elastomeric parts 40 and 42 upon co-vulcanization thereof. Bonding between the first and second elastomeric parts 40 and 42 by cross-linking strongly resists separation of the first elastomeric part 40 from the second elastomeric part 42 upon movement of the rack 14 in sliding contact with the first elastomeric part 40.

The second elastomeric part 42 further has an inner surface 90 defining a cavity 92 with a recess 94. A circular coil spring 96 is received in the recess 94, and exerts a force radially inward to hold the seal 10 against the rack 14. The degree to which the surface portion 54 of the first elastomeric part 40 is pressed in hydraulic sealing contact with the outer surface 56 of the rack 14 is thus further defined in part by the force exerted by the coil spring 96.

The conditions encountered by the seal 10 in the hydraulic power steering assembly include temperatures as low as approximately $-45°$ F. and as high as approximately $350°$ F. Therefore, the seal 10 is resistant to very low temperatures as well as very high temperatures. The conditions encountered by the seal 10 in the hydraulic power steering assembly also include contact with the hydraulic power steering fluid, which preferably is automatic transmission fluid. The seal 10 is also resistant to such fluid.

The first and second elastomeric parts 40 and 42 are formed of vulcanizable elastomeric compositions. In view of the temperature range and chemical conditions encountered by the seal 10, the first elastomeric part 40 is formed essentially of a first elastomeric composition and the second elastomeric part 42 is formed essentially of a second elastomeric composition which differs from the first elastomeric composition. The first elastomeric composition remains flexible, and therefore enables the first elastomeric part 40 to remain in hydraulic sealing contact with the rack 14, throughout a wide range of conditions encountered by the seal 10 in the hydraulic power steering assembly. The second elastomeric composition remains flexible throughout a narrower range of conditions, but is less costly. The seal 10 is thus efficiently constructed with the more costly first elastomeric part 40 being smaller, and being supported in a sealing position by the less costly second elastomeric part 42.

In order to provide the best temperature resistant and chemical resistant properties for the first elastomeric part 40, the first elastomeric composition is comprised primarily of a fluorinated rubber. The fluorinated rubber can be a fluorocarbon elastomer or a phosphonitrilic fluoroelastomer. A preferred fluorinated rubber is a phosphonitrilic fluoroelastomer marketed by Ethyl Corporation under the trademark "PNF". The "PNF" rubber is supplied in a compounded form including the "PNF" rubber as the base polymer, and also including fillers, curatives and other ingredients, as is known in the art. For example, two such "PNF" rubber compounds which are preferred for use in accordance with the present invention are marketed by Ethyl Corporation with the trademarks "PNF" and "EYPEL-F," and have the compound numbers 808 and 7003. Those rubber compounds use a peroxide curing system.

The "PNF" rubber compounds are relatively costly. Therefore, the first elastomeric composition can alternatively be formed of a blend of a "PNF" rubber compound and another, less costly fluorinated rubber compound. One preferred less costly fluorinated rubber compound is marketed by the 3M Company under the trademark "AFLAS" and has a tetrafluoroethylene-/propylene copolymer as the base polymer. The preferred "AFLAS" rubber compound is marketed as "AFLAS-150," and has the formulation shown Table I below.

TABLE I

| "AFLAS" - 150 | |
|---|---|
| Base polymer | 100 |
| Peroxymon F-100(a) (peroxide curative) | 1 |
| Triallyl isocyanurate(b)(crosslink improver) | 5 |
| MT carbon black(c)(reinforcing filler) | 35 |
| Sodium stearate (process aid) | 2 |

If a blend of "PNF" and "AFLAS" rubber compounds is used, the "AFLAS" rubber compound is preferably only a small percentage of the blend, preferably less than 25% by weight. The blend composition thus retains, essentially, the properties of the "PNF" rubber. Preferred proportions in the blend are 80% by weight "PNF" rubber compound and 20% by weight "AFLAS" rubber compound.

Other less costly fluorinated rubber compounds that can be blended with the "PNF" rubber compound include those marketed by the 3M Company under the trademarks "FLUOREL" and "FLUO II." The "FLUO" rubber compound has a base polymer which is a vinylidene fluoride/hexafluoropropylene/tetrafluoroethylene (FKM) terpolymer. The "FLUOR II" rubber compound has a tetrafluoroethylene/ethylene copolymer as the base polymer. Such blends would also retain, essentially, the properties of the "PNF" rubber.

The second elastomeric composition is comprised primarily of a fluorinated rubber compound which, as noted above, is preferably less costly than the first fluorinated rubber compound. Accordingly, the second elastomeric composition is preferably comprised of an "AFLAS" and/or a "FLUOR" rubber compound and is substantially free of a "PNF" rubber compound. Most preferably, the second elastomeric composition is comprised entirely of the "AFLAS-150" rubber compound.

An advantage in the use of the "AFLAS-150" rubber compound for the second elastomeric part 42, in combination with the "EYPEL-F" rubber compound for the first elastomeric part 40, is that both compounds use a peroxide curing system. This results in a better bond upon co-vulcanization of the two parts 40 and 42.

If the first elastomeric composition is a blend as described above, the second elastomeric composition preferably comprises the same rubber compound which is blended into the first elastomeric composition to reduce the cost of the first elastomeric composition. The first and second elastomeric compositions are then more compatible and provide a stronger bond by cross-linking upon co-vulcanization. The base polymer of the compound which is blended into the first composition readily cross-links with the same base polymer in the second composition.

Tables II and III set forth properties of sample rubber compounds which relate to the conditions encountered by the seal 10 in the hydraulic power steering assembly. The $TR_{10}$ of a rubber compound is the temperature at which the rubber compound becomes very hard, and is measured in accordance with ASTM D 1329. The range of temperature resistance of each rubber compound listed in Table II is thus indicated by the $TR_{10}$ value and the upper limit temperature, which is an estimate of the maximum temperature which the material can withstand for a substantial period of time. Other properties of the rubber compounds listed in Table II include the tensile strength and the elongation at break of test sample pieces. The first and second rubber compositions should each have a tensile strength of at least 1,000 psi and an elongation at break of at least 75%.

TABLE II

| | $TR_{10}$ °F. | Upper Limit °F. (Approx.) | Tensile Strength (psi) | Elongation % |
|---|---|---|---|---|
| "PNF" | −56 | 350 | 1805 | 185 |
| 80/20 blend of "PNF" and "AFLAS" | −49 | 350 | 1700 | 135 |
| "AFLAS" | +37 | 325 | 3200 | 230 |

The chemical resistance of the rubber compounds is expressed in Table III with reference to their resistance to hydraulic power steering fluid, and particularly with reference to their ability to remain stable throughout exposure to such fluid. In accordance with ASTM D 1470, each of the three sample rubber compounds was maintained in contact with an automatic transmission fluid marketed by Deutsche Pentosin-Werke GmbH with the trademark "PENTOSIN CHF 11S" for 96 hours at 150° C. Each was found to have excellent chemical resistance. In particular, the "PNF" rubber compound was found to have a change in tensile strength of +3% and a change in elongation at break of +6% after such contact with the "PENTOSIN CHF 11S" fluid. The "PNF" rubber compound was also found not to experience cracking after such contact with the fluid.

Another property of the rubber compounds which is set forth in Table III is the Ross Flexlife. A sample piece of each of the three rubber compounds was bonded to a respective sample piece of "AFLAS" rubber compound by cross-linking between the two pieces. The Ross Flexlife indicates the strength of the bond between the cross-linked pieces, and is expressed as the number of cycles which the bond withstood when flexed in accordance with ASTM D 1052. As shown in Table III, each of the three test bonds remained intact throughout an arbitrary number of 10,000 cycles. The test bonds formed in accordance with the invention thus exhibited excellent strength. As described above, such a bond is formed in the seal 10 between the first and second elastomeric parts 40 and 42.

TABLE III

| | Chemical Resistance | Ross Flexlife | Shore A Hardness |
|---|---|---|---|
| "PNF" | Excellent | >10,000 | 70 |
| 80/20 blend of "PNF" and "AFLAS" | Excellent | >10,000 | 77 |
| "AFLAS" | Excellent | >10,000 | 83 |

Other rubber compounds contemplated for use in the seal 10 in accordance with the present invention include acrylonitrile-butadiene rubber (NBR) compounds, hydrogenated acrylonitrile-butadiene rubber (HNBR) compounds, and copolymers of vinylidene fluoride and hexafluoropropylene such as those marketed by E.I. du Pont de Nemours & Co. with the trademarks "VITON" and "VITON GLT". As shown in Table IV, these alternative rubber compounds are suitable for use in the first and second elastomeric parts in the seal 10 in accordance with the invention, but have narrower temperature ranges and less chemical resistance in comparison to the preferred rubber compounds listed in Tables II and III.

TABLE IV

| | TR$_{10}$ °F. | Upper Limit °F. (Approx.) | Chemical Resistance |
|---|---|---|---|
| "NBR" | −45 | 250 | Medium |
| "HNBR" | −25 | 300 | Medium |
| "VITON" | 0 | <300 | Medium |
| "VITON GLT" | −23 | <300 | Medium |

Figure 3:
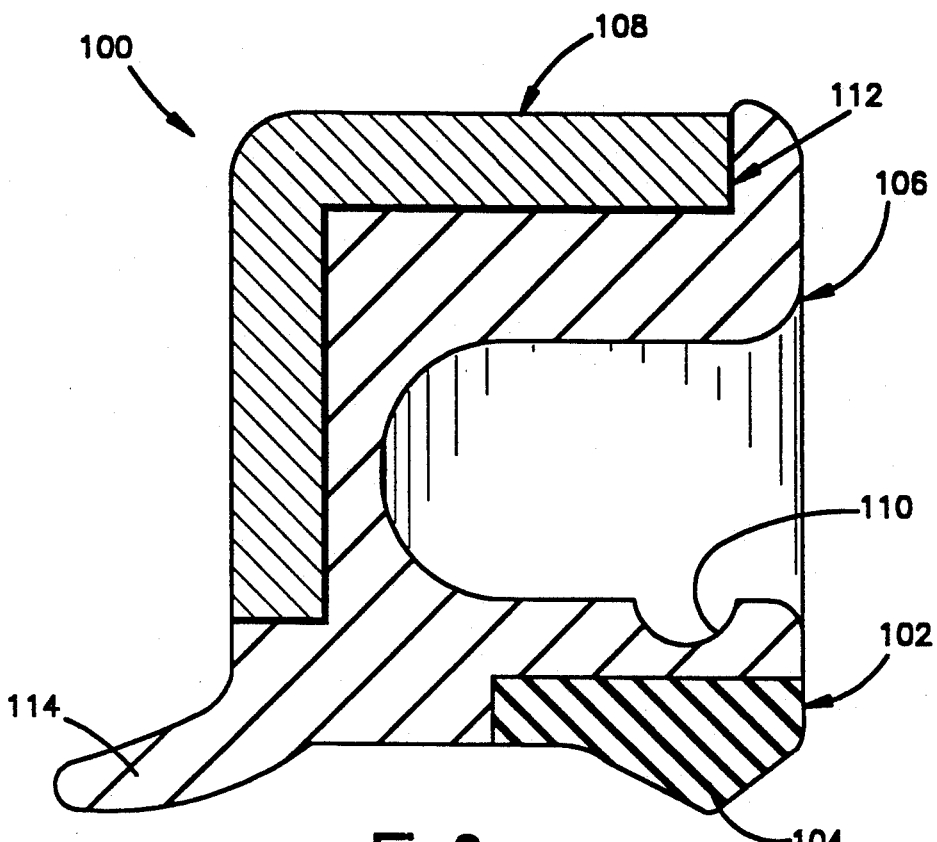
FIG. 3 is a sectional view of a second embodiment of the present invention.

A second embodiment of the present invention is shown in FIG. 3. As shown in FIG. 3, a seal 100 constructed in accordance with the present invention is a ring shaped member having a first elastomeric part 102 with a fluid sealing lip 104, a second elastomeric part 106 and a reinforcing part 108. The second elastomeric part 106 has a recess 110 for receiving a coil spring, and is fixed to the reinforcing part 108 by a bond 112. The first and second elastomeric parts 102 and 106 are joined to each other by cross-linking upon co-vulcanization. The preferences for the materials of which the seal 100 is made are the same as the preferences for the materials of which seal 10 is made.

The seal 100 differs from the seal 10 in that a dust lip portion 114 of the seal 100 is constructed as a portion of the second elastomeric part 106 rather than being constructed as a portion of the first elastomeric part 102. The first elastomeric part 102 of the seal 100 is thus relatively smaller than the first elastomeric part 40 of the seal 10 described above, and therefore comprises a relatively lesser amount of the first elastomeric composition. The seal 100 will therefore remain in hydraulic sealing contact with the peripheral surface of a shaft throughout the same wide range of temperatures and chemical conditions as does the seal 10, but is less costly because it comprises a lesser amount of the first elastomeric composition.

Figure 4:
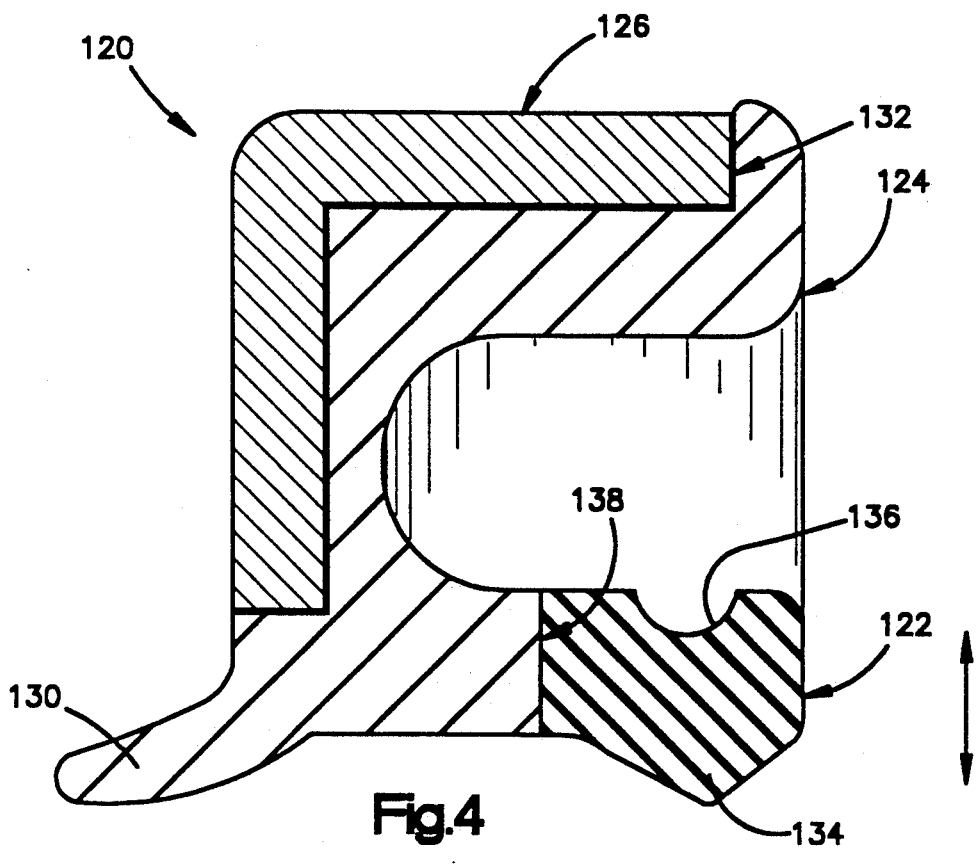
FIG. 4 is a sectional view of a third embodiment of the present invention.

A third embodiment of the present invention is shown in FIG. 4. The third embodiment of the invention is a ring-shaped seal 120 having a first elastomeric part 122, a second elastomeric part 124 and a reinforcing part 126. The preferences for the materials of which the seal 120 is made are the same as the preferences for the materials of which the seals 10 and 100 are made.

The second elastomeric part 124 of the seal 120 has a dust lip portion 130, and is fixed to the reinforcing part 126 by a bond 132. The first elastomeric part 122 has a fluid sealing lip 134, and is fixed to the second elastomeric part 124 by cross-linking upon co-vulcanization. The first elastomeric part 122 also has a recess 136 for receiving a coil spring.

As shown in FIG. 4, the first elastomeric part 122 extends axially from the interface 138 between the first and second elastomeric parts 122 and 124. In comparison with the first elastomeric parts 40 and 102 described above with reference to FIGS. 1, 2 and 3, the first elastomeric part 122 is thus supported by the second elastomeric part 124 to flex more freely in the radial direction, as indicated by the arrow shown in FIG. 4. The first elastomeric part 122 can flex more freely because the second elastomeric part 124 does not have a backing portion located radially outward of the first elastomeric part 122, as do the seals 10 and 100 shown in FIGS. 1, 2 and 3. The seal 120 therefore remains in hydraulic sealing contact with the peripheral surface of a shaft throughout the same wide range of temperatures and chemical conditions as do the seals 10 and 100, and additionally accommodates shafts which are not as exactly concentric with the surrounding sleeve, or which have peripheral surfaces that are not as truly cylindrical as shown in FIG. 1.

From the above description of the invention, those skilled in the art will perceive improvements, changes and modifications. Such improvements, changes and modifications within the skill of the art are intended to be covered by the appended claims.

Having described the invention, the following is claimed:

1. A hydraulic shaft seal receivable over the peripheral surface of a shaft, said hydraulic shaft seal comprising:
   a first elastomeric part having a surface means for sealingly engaging the peripheral surface of the shaft, said first elastomeric part being formed of a first vulcanizable elastomeric composition which comprises a first fluorinated rubber;
   supporting means for supporting said first elastomeric part in sealing engagement with the peripheral surface of the shaft, said supporting means comprising a second elastomeric part formed of a second vulcanizable elastomeric composition which comprises a second fluorinated rubber, said second elastomeric part being substantially free of said first fluorinated rubber; and
   said first and second elastomeric parts being co-vulcanized and bonded to each other by cross-linking of said first elastomeric composition with said second elastomeric composition.

2. A hydraulic shaft seal receivable over the peripheral surface of a shaft, said hydraulic shaft seal comprising:
   a first elastomeric part having a surface means for sealingly engaging the peripheral surface of the shaft, said first elastomeric part being formed of a first vulcanizable elastomeric composition which comprises a first fluorinated rubber; and
   supporting means for supporting said first elastomeric part in sealing engagement with the peripheral surface of the shaft, said supporting means comprising a second elastomeric part formed of a second vulcanizable elastomeric composition which comprises a second fluorinated rubber, said second elastomeric part being substantially free of said first fluorinated rubber;
   said first and second elastomeric parts being co-vulcanized and bonded to each other by cross-linking of said first elastomeric composition with said second elastomeric composition;
   said first fluorinated rubber being one which remains flexible to a temperature of approximately −45° F. and is serviceable up to a temperature of approximately 350° F.;
   said first elastomeric composition comprising a blend of said first and second fluorinated rubbers.

3. A hydraulic shaft seal as defined in claim 2 wherein said blend comprises less than 25% by weight of said second fluorinated rubber.

4. A hydraulic shaft seal receivable over the peripheral surface of a shaft, said hydraulic shaft seal comprising:
   a first elastomeric part having a surface means for sealingly engaging the peripheral surface of the shaft, said first elastomeric part being formed of a first vulcanizable elastomeric composition which comprises a first fluorinated rubber; and supporting means for supporting said first elastomeric part in sealing engagement with the peripheral surface of the shaft, said supporting means comprising a second elastomeric part formed of a second vulcanizable elastomeric composition which comprises a second fluorinated rubber, said second elastomeric part being substantially free of said first fluorinated rubber;

said first and second elastomeric parts being co-vulcanized and bonded to each other by cross-linking of said first elastomeric composition with said second elastomeric composition;

said first fluorinated rubber being a phosphonitrilic fluoroelastomer.

5. A hydraulic shaft seal as defined in claim 4 wherein said second fluorinated rubber is a tetrafluoroethylene/propylene copolymer.

6. A hydraulic shaft seal as defined in claim 4 wherein said second fluorinated rubber is a tetrafluoroethylene/ethylene copolymer.

7. A hydraulic shaft seal as defined in claim 4 wherein said second fluorinated rubber is a vinylidene fluoride/hexafluoropropylene tetrafluoroethylene terpolymer.

8. A hydraulic shaft seal receivable over the peripheral surface of a shaft, said hydraulic shaft seal comprising:

a first elastomeric part having a surface means for sealingly engaging the peripheral surface of the shaft, said first elastomeric part being formed of a first vulcanizable elastomeric composition which comprises a first fluorinated rubber; and supporting means for supporting said first elastomeric part in sealing engagement with the peripheral surface of the shaft, said supporting means comprising a second elastomeric part formed of a second vulcanizable elastomeric composition which comprises a second fluorinated rubber, said second elastomeric part being substantially free of said first fluorinated rubber;

said first and second elastomeric parts being co-vulcanized and bonded to each other by cross-linking of said first elastomeric composition with said second elastomeric composition;

said first elastomeric composition further comprising said second fluorinated rubber, said first elastomeric part being bonded to said second elastomeric part by at least a portion of said second fluorinated rubber in said first elastomeric composition which is cross-linked with at least a portion of said second fluorinated rubber in said second elastomeric composition.

9. A hydraulic shaft seal as defined in claim 8 wherein said first fluorinated rubber is a phosphonitrilic fluoroelastomer, said second fluorinated rubber being a tetrafluoroethylene/propylene copolymer.

10. A hydraulic shaft seal as defined in claim 9 wherein approximately 80% of said first elastomeric composition is a compound substantially comprised of said phosphonitrilic fluoroelastomer and approximately 20% of said first elastomeric composition is a compound substantially comprised of said tetrafluoroethylene/propylene copolymer.

11. A hydraulic shaft seal as defined in claim 8 wherein said first fluorinated rubber is a phosphonitrilic fluoroelastomer, said second fluorinated rubber being a tetrafluoroethylene/ethylene copolymer.

12. A hydraulic shaft seal as defined in claim 11 wherein approximately 80% of said first elastomeric composition is a compound substantially comprised of said phosphonitrilic fluoroelastomer and approximately 20% of said first elastomeric composition is a compound substantially comprised of said tetrafluoroethylene/ethylene copolymer.

13. A hydraulic shaft seal receivable over the peripheral surface of a shaft, said hydraulic shaft seal comprising:

a first elastomeric part having a surface means for sealingly engaging the peripheral surface of the shaft, said first elastomeric part being formed of a first vulcanizable elastomeric composition; and supporting means for supporting said first elastomeric part in sealing engagement with the peripheral surface of the shaft, said supporting means comprising a second elastomeric part formed of a second vulcanizable elastomeric composition;

said first and second elastomeric parts being co-vulcanized and bonded to each other by cross-linking of said first elastomeric composition with said second elastomeric composition;

approximately 80% of said first vulcanizable elastomeric composition being a first compound substantially comprised of a phosphonitrilic fluoroelastomer and approximately 20% of said first vulcanizable elastomeric composition being a second compound substantially comprised of a tetrafluoroethylene/propylene copolymer, said second vulcanizable elastomeric composition consisting essentially of said second compound, said first and second compounds having the same curing system.

* * * * *